United States Patent
Lee et al.

(10) Patent No.: US 10,452,165 B2
(45) Date of Patent: Oct. 22, 2019

(54) INPUT DEVICE, METHOD, AND SYSTEM FOR ELECTRONIC DEVICE

(71) Applicant: Samsung Electronics Co., Ltd., Suwon-si, Gyeonggi-do (KR)

(72) Inventors: Younggyun Lee, Gumi-si (KR); Dooyong Park, Gumi-si (KR); Jaehak Lee, Gumi-si (KR); Eunjung Seo, Gumi-si (KR); Minho Kim, Gumi-si (KR); Gyucheol Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/296,922

(22) Filed: Mar. 8, 2019

(65) Prior Publication Data

US 2019/0204940 A1 Jul. 4, 2019

Related U.S. Application Data

(63) Continuation of application No. 14/674,773, filed on Mar. 31, 2015, now Pat. No. 10,228,774.

(30) Foreign Application Priority Data

Apr. 3, 2014 (KR) ........................ 10-2014-0040109

(51) Int. Cl.
G06F 3/0354 (2013.01)
G06F 3/0488 (2013.01)
G06F 3/046 (2006.01)

(52) U.S. Cl.
CPC ........ G06F 3/03545 (2013.01); G06F 3/0488 (2013.01); *G06F 3/046* (2013.01)

(58) Field of Classification Search
CPC ..... G06F 3/03545; G06F 3/0488; G06F 3/046
See application file for complete search history.

(56) References Cited

U.S. PATENT DOCUMENTS

| 4,406,555 | A  | 9/1983  | Tsai |
| 9,229,542 | B2 | 1/2016  | Krete |
| 2002/0148655 | A1 | 10/2002 | Cho et al. |
| 2005/0122319 | A1 | 6/2005  | Sakurai et al. |

(Continued)

FOREIGN PATENT DOCUMENTS

| CN | 102609116 A | 7/2012 |
| CN | 103064535 A | 4/2013 |

(Continued)

OTHER PUBLICATIONS

European Search Report dated Sep. 6, 2017, issued in the European Application No. 15772407.1.

(Continued)

*Primary Examiner* — Aneeta Yodichkas
(74) *Attorney, Agent, or Firm* — Jefferson IP Law, LLP

(57) ABSTRACT

An input method of an electronic device using an input device including a drawing unit is provided. The input method includes acquiring drawing unit related information, confirming an attribute of the drawing unit based on the acquired drawing unit-related information, receiving a drawing input by an input device, to which the drawing unit is attached, using a touch panel of the electronic device, and outputting a drawing expression through the display of the electronic device in response to an attribute of the drawing unit and a drawing pattern of the drawing input.

20 Claims, 15 Drawing Sheets

(56) References Cited

U.S. PATENT DOCUMENTS

| | | |
|---|---|---|
| 2005/0133319 A1 | 6/2005 | Wilhelm |
| 2009/0135164 A1 | 5/2009 | Kyung et al. |
| 2009/0289922 A1 | 11/2009 | Henry |
| 2010/0160041 A1 | 6/2010 | Grant et al. |
| 2011/0007037 A1 | 1/2011 | Ogawa |
| 2012/0158629 A1 | 6/2012 | Hinckley et al. |
| 2012/0194484 A1 | 8/2012 | Lehman |
| 2012/0206330 A1 | 8/2012 | Cao et al. |
| 2012/0331546 A1 | 12/2012 | Falkenburg et al. |
| 2013/0082983 A1 | 4/2013 | Liu et al. |
| 2013/0100086 A1 | 4/2013 | Kim |
| 2013/0135220 A1 | 5/2013 | Alameh et al. |
| 2013/0135263 A1 | 5/2013 | Omura |
| 2013/0194242 A1 | 8/2013 | Park et al. |
| 2013/0203353 A1 | 8/2013 | Kim et al. |
| 2014/0168177 A1 | 6/2014 | Mkrtchyan et al. |
| 2015/0022503 A1 | 1/2015 | Chang et al. |
| 2015/0177908 A1 | 6/2015 | Kuroda |

FOREIGN PATENT DOCUMENTS

| | | |
|---|---|---|
| CN | 103620529 A | 3/2014 |
| KR | 10-2012-0054362 A | 5/2012 |
| KR | 10-1164667 B1 | 7/2012 |
| KR | 10-1221895 B1 | 1/2013 |
| KR | 10-1267985 B1 | 5/2013 |
| KR | 10-2013-0089389 A | 8/2013 |
| KR | 10-2013-0091140 A | 8/2013 |
| KR | 10-1614575 B1 | 4/2016 |
| WO | 2013176066 A1 | 11/2013 |

OTHER PUBLICATIONS

China National Intellectual Property Administration Office Action dated Sep. 5, 2018, issued in Chinese Application No. 201580028620.9.

European Search Report dated Jan. 16, 2018, issued in European Patent Application No. 15772407.1-1216.

INPUT DEVICE, METHOD, AND SYSTEM FOR ELECTRONIC DEVICE

CROSS-REFERENCE TO RELATED APPLICATION(S)

This application is a continuation application of prior application Ser. No. 14/674,773, filed on Mar. 31, 2015, which will issue as U.S. Pat. No. 10,228,774 on Mar. 12, 2019, which claimed the benefit under 35 U.S.C. § 119(a) of a Korean patent application filed on Apr. 3, 2014 in the Korean Intellectual Property Office and assigned Serial number 10-2014-0040109, the entire disclosure of which is hereby incorporated by reference.

TECHNICAL FIELD

The present disclosure relates to an input device, method and system for an electronic device.

BACKGROUND

As smart phones have been widely used, interfacing techniques between users and electronic devices, that is, techniques enabling an electronic device to recognize various user inputs and to provide various outputs according to recognized results, have been increasingly developed.

In particular, it has been possible for a user to provide an input to an electronic device conveniently and intuitively as if he or she writes a note by using an input device, such as a pen, on a user input interface, such as a touch panel.

For example, with a currently used touch pen, it is possible to provide various drawing inputs to an electronic device, in which case the electronic device may output various drawing expressions on a display panel to correspond to the drawing inputs, respectively.

The above information is presented as background information only to assist with an understanding of the present disclosure. No determination has been made, and no assertion is made, as to whether any of the above might be applicable as prior art with regard to the present disclosure.

SUMMARY

At present, although an intuitive drawing input may be provided to an electronic device with a touch pen, there is a limit in implementing a practical writing feeling, like a drawing on a paper, on the electronic device using a writing instrument other than a pen, such as a brush, for example.

Aspects of the present disclosure are to address at least the above-mentioned problems and/or disadvantages and to provide at least the advantages described below. Accordingly, an aspect of the present disclosure is to provide an input device, method and system for an electronic device are intended to implement a drawing feeling of a practical writing instrument other than a pen for a drawing implemented on the electronic device, and to output the drawing to be similar to a practical one.

In accordance with an aspect of the present disclosure, an input device for an electronic device is provided. The input device includes a pen including an input reactor configured to provide an input signal to the electronic device, and at least one detachable drawing unit attached to the pen and including a drawing contact unit.

In accordance with another aspect of the present disclosure, an input method of an electronic device is an input method of an electronic device using an input device including a drawing unit is provided. The input method includes acquiring drawing unit-related information, confirming an attribute of the drawing unit based on the acquired drawing unit-related information, receiving a drawing input by an input device, to which the drawing unit is attached, using a touch panel of the electronic device, and outputting a drawing expression through the display of the electronic device in response to an attribute of the drawing unit and a drawing pattern of the drawing input.

In accordance with another aspect of the present disclosure, an input system of an electronic device is provided. The input system includes an input device including a pen including an input reactor configured to provide an input signal to the electronic device, and at least one detachable drawing unit attached to the pen and including a drawing contact unit, and an electronic device including a touch panel configured to receive a drawing input by the input device, to which the drawing unit is attached, a display panel configured to output a drawing expression corresponding to the drawing input, and a processor configured to confirm an attribute of the drawing unit based on unique information of the drawing unit, and to control the drawing expression output in response to the attribute of the drawing unit and a drawing pattern of the drawing input.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
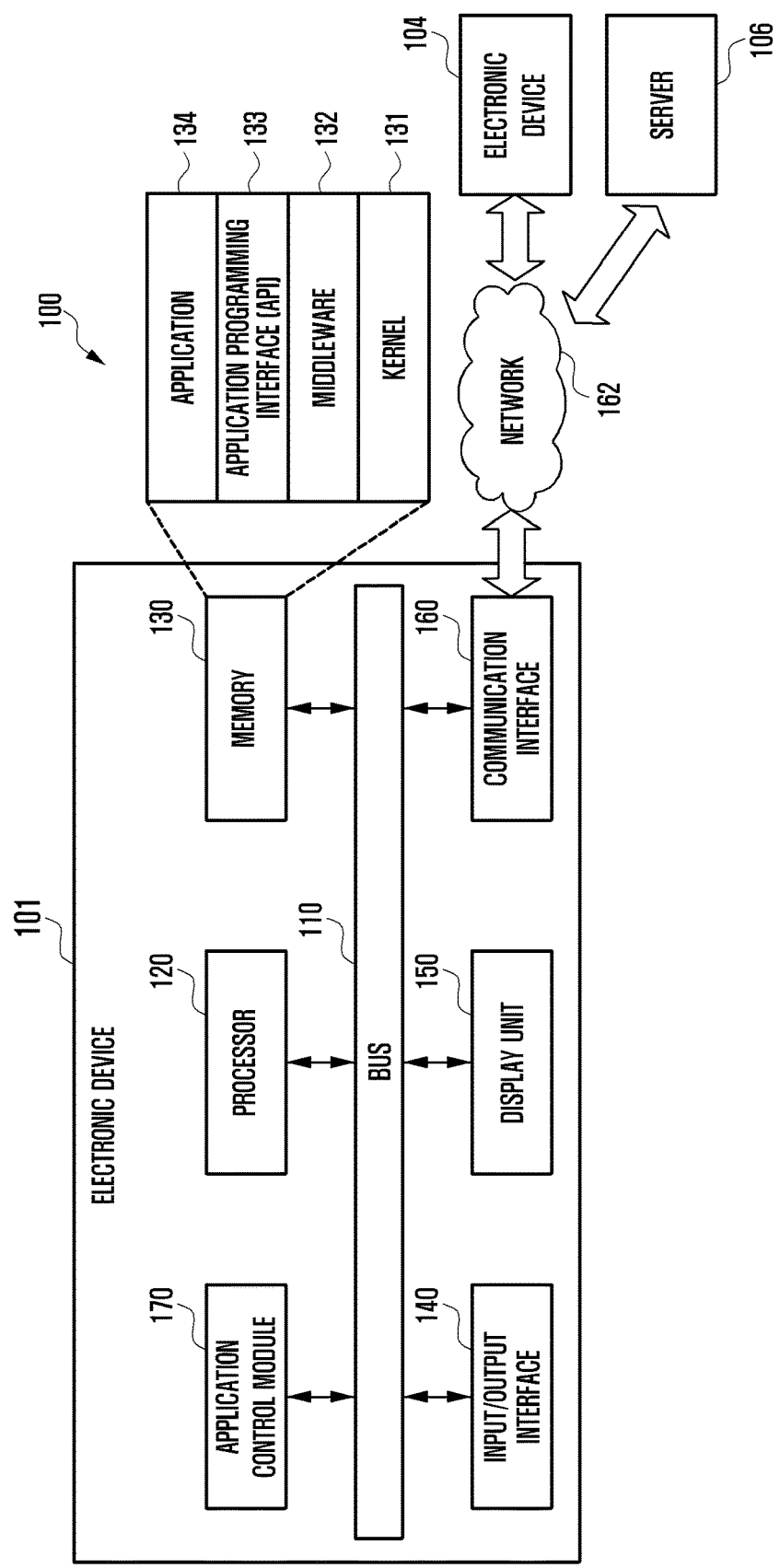
FIG. 1 illustrates a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used in the present disclosure, the expression "include" or "may include" refers to the existence of a corresponding function, operation, or constituent element, and does not limit one or more additional functions, operations, or constituent elements. Further, as used in the present disclosure, the term such as "include" or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

As used in the present disclosure, the expression "or" includes any or all combinations of words enumerated together. For example, the expression "A or B" may include A, may include B, or may include both A and B.

While expressions including ordinal numbers, such as "first" and "second", as used in the present disclosure may modify various constituent elements, such constituent elements are not limited by the above expressions. For example, the above expressions do not limit the sequence and/or importance of the corresponding constituent elements. The above expressions may be used merely for the purpose of distinguishing a constituent element from other constituent elements. For example, a first user device and a second user device indicate different user devices although both are user devices. For example, a first constituent element may be termed a second constituent element, and likewise a second constituent element may also be termed a first constituent element without departing from the scope of the present disclosure.

When a component is referred to as being "connected" or "accessed" to any other component, it should be understood that the component may be directly connected or accessed to the other component, but another new component may also be interposed between them. Contrarily, when a component is referred to as being "directly connected" or "directly accessed" to any other component, it should be understood that there is no new component between the component and the other component.

The terms as used in various embodiments of the present disclosure are merely for the purpose of describing particular embodiments and are not intended to limit the present disclosure. Singular forms are intended to include plural forms unless the context clearly indicates otherwise.

Unless defined otherwise, all terms used herein, including technical terms and scientific terms, have the same meaning as commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to the present disclosure may be a device including a communication function. For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), a Moving Picture Experts Group (MPEG-1 or MPEG-2) Audio Layer III (MP3) player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smartwatch).

According to various embodiments, the electronic device may be a smart home appliance with a communication function. The smart home appliance as the electronic device, for example, may include at least one of a television, a digital versatile disc (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame.

According to various embodiments, the electronic devices may include at least one of various medical devices (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), an automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) in a shop.

According to various embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to the present disclosure may be a combination of one or more of the aforementioned various devices. Further, the electronic device according to the present disclosure may be a flexible device. Further, it will be apparent to those skilled in the art that the electronic device according to the present disclosure is not limited to the aforementioned devices.

Hereinafter, an electronic device according to various embodiments of the present disclosure will be discussed with reference to the accompanying drawings. The term "a user" as used in various embodiments may refer to any person who uses an electronic device or any other device (e.g., an artificial intelligence electronic device) using an electronic device.

FIG. 1 illustrates a network environment including an electronic device according to various embodiments of the present disclosure.

Referring to FIG. 1, a network environment 100 may include an network device 101. The electronic device 101 may include a bus 110, a processor 120, a memory 130, an input/output interface 140, a display unit 150, a communication interface 160, and an application control module 170.

The bus 110 may be a circuit interconnecting the aforementioned components and transmitting communication (e.g., a control message) between the aforementioned components.

The processor 120, for example, may receive instructions from the aforementioned components (e.g., the memory 130, the input/output interface 140, the display unit 150, the communication interface 160, and the application control module 170) other than the processor 120 through the bus 110, decode the received instructions, and perform operations or data processing according to the decoded instructions.

The memory 130 may store instructions or data received from or generated by the processor 120 or other components (e.g., the input/output interface 140, the display unit 150, the communication interface 160, and the application control module 170). The memory 130 may include programming modules, for example, a kernel 131, middleware 132, an application programming interface (API) 133, and applications 134. Each of the programming modules as described above may be formed by software, firmware, hardware, or a combination of two or more thereof.

The kernel 131 may control or manage system resources (e.g., the bus 110, the processor 120, and the memory 130) used to execute operations or functions implemented in the remaining other programming modules, for example, the middleware 132, the API 133, and the applications 134. Further, the kernel 131 may provide an interface that allows the middleware 132, the API 133, or the applications 134 to access and control or manage individual components of the electronic device 101.

The middleware 132 may serve to mediate between the API 133 or the applications 134 and the kernel 131, that is, allow the API 133 or the application 134 to communicate and exchange data with the kernel 131. Further, the middleware 132 may perform control (e.g., scheduling or load balancing) for task requests received from the applications 134 by using, for example, a method of assigning a priority for use of the system resource (e.g., the bus 110, the processor 120, or the memory 130) of the electronic device 101 to at least one of the applications 134.

The API 133 is an interface for allowing the applications 134 to control functions provided by the kernel 131 and the middleware 132, and may include at least one interface or function (e.g., instruction) for, for example, file control, window control, image processing, or text control.

According to various embodiments, the applications 134 may include an Short Message Service (SMS)/Multimedia Messaging Service (MMS) application, an e-mail application, a calendar application, an alarm application, a health care application (e.g., an application for measuring the amount of exercise or blood glucose), and an environmental information application (e.g., an application for providing atmospheric pressure information, humidity information, temperature information, and the like). Additionally or alternatively, the applications 134 may include an application associated with information exchange between the electronic device 101 and an external electronic device (e.g., another electronic device 104). The application associated with information exchange, for example, may include a notification relay application for transferring specific information to the external electronic device or a device management application for managing the external electronic device.

For example, the notification relay application may include a function of transferring notification information, generated in another application of the electronic device 101 (e.g., the SMS/MMS application, the e-mail application, the health care application, or the environmental information application), to an external electronic device (e.g., the other electronic device 104). Additionally or alternatively, the notification relay application, for example, may receive notification information from an external electronic device (e.g., the other electronic device 104) and provide the received notification information to a user. The device management application, for example, may manage (e.g., install, remove, or update) a function for at least a part of an external electronic device (e.g., the other electronic device 104) communicating with the electronic device 101 (e.g., a function of turning on/off an external electronic device (or some components thereof) or adjusting the brightness (or resolution) of a display), an application running on the external electronic device, or a service provided in the external electronic device (e.g., a calling or messaging service).

According to various embodiments, the applications 134 may include an application specified according to the attribute (e.g., type) of an external electronic device (e.g., the other electronic device 104). For example, when the external electronic device is an MP3 player, the applications 134 may include an application associated with music playback. Similarly, when the external electronic device is a mobile medical device, the applications 134 may include an application associated with health care. According to an embodiment, the applications 134 may include at least one of an application assigned to the electronic device 101 and an application received from an external electronic device (e.g., the server 106 or the other electronic device 104).

The input/output interface 140, for example, may transfer instructions or data, input from a user through an input/output device (e.g., a sensor, a keyboard, or a touch screen), to the processor 120, the memory 130, the communication interface 160, or the application control module 170 through the bus 110. For example, the input/output interface 140 may provide the processor 120 with data corresponding to a user's touch input through a touch screen. Further, the input/output interface 140 may, for example, receive instructions or data from the processor 120, the memory 130, the communication interface 160, or the application control module 170 through the bus 110 and output the received instructions or data through the input/output device (e.g., a speaker or a display). For example, the input/output interface 140 may output voice data processed by the processor 120 to a user through a speaker.

The display unit 150 may display various pieces of information (e.g., multimedia data or text data) to a user.

The communication interface 160 may establish communication between the electronic device 101 and an external electronic device (e.g., the other electronic device 104 or the server 106). For example, the communication interface 160 may be connected to the network 162 through wireless or wired communication and thereby communicate with the external device. The wireless communication, for example, may include at least one of WiFi, Bluetooth (BT), near field communication (NFC), a GPS, and cellular communication (e.g., Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile communications (GSM)). The wired communication, for example, may include at least one of a universal serial bus (USB), a high definition multimedia interface (HDMI), recommended standard 232 (RS-232), and a plain old telephone service (POTS).

According to an embodiment, the network 162 may be a telecommunications network. The telecommunications network may include at least one of a computer network, the Internet, the Internet of things, and a telephone network. According to an embodiment, a protocol (e.g., a transport layer protocol, a data link layer protocol, or a physical layer protocol) for communication between the electronic device 101 and an external device may be supported by at least one of the applications 134, the application programming interface 133, the middleware 132, the kernel 131, and the communication interface 160.

The application control module 170 may process at least some pieces of information acquired from other components (e.g., the processor 120, the memory 130, the input/output interface 140, and the communication interface 160) and provide the processed information to a user in various ways. For example, the application control module 170 may recognize information on connection components provided in the electronic device 101, store the information on connection components in the memory 130, and execute the applications 130, based on the stored information on connection components.

Figure 2:
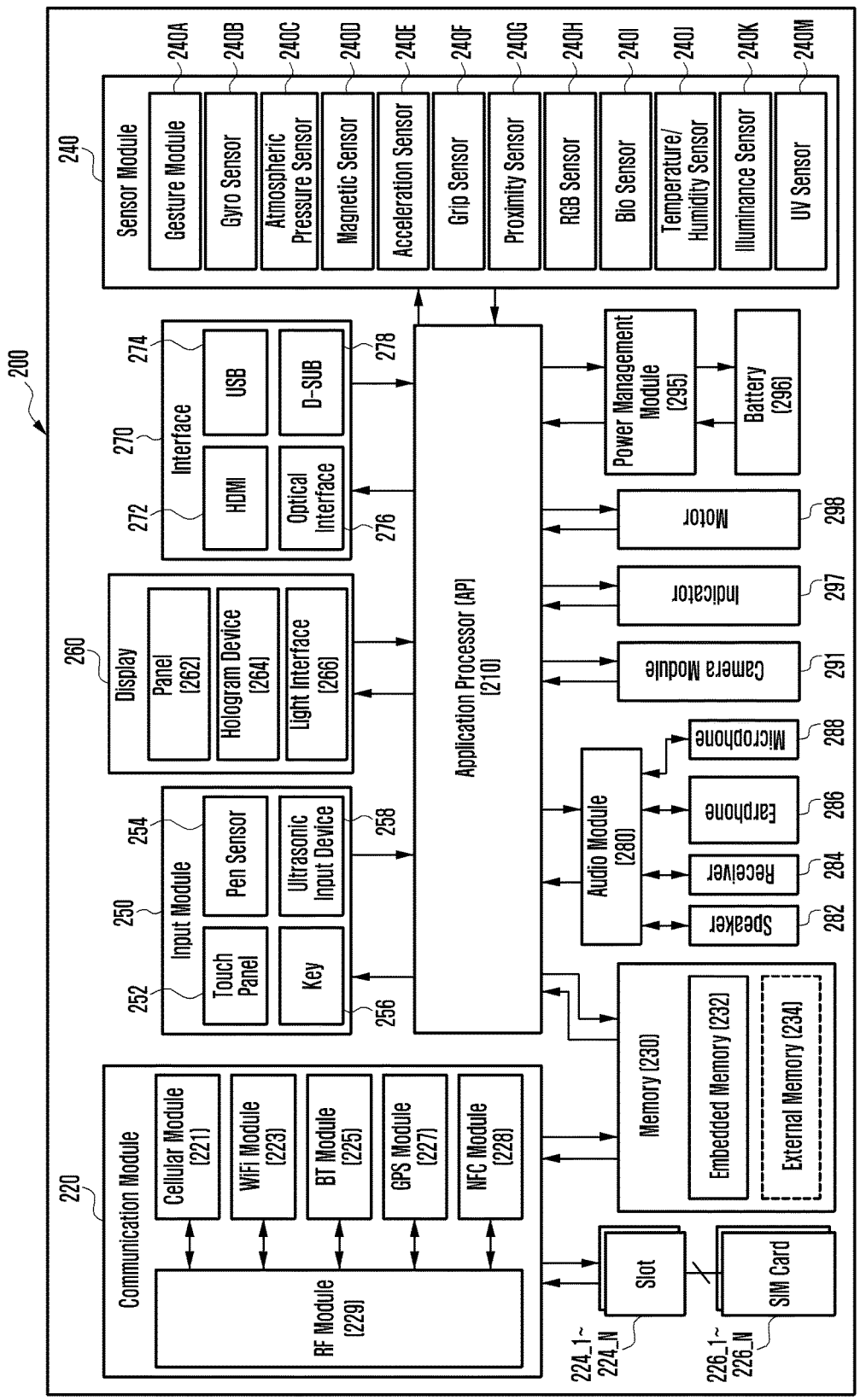
FIG. 2 is a block diagram of an electronic device according to various embodiments of the present disclosure.

FIG. 2 illustrates a block diagram of an electronic device according to various embodiments of the present disclosure. The electronic device, for example, may constitute all or a part of the electronic device 101 shown in FIG. 1.

Referring to FIG. 2, an electronic device 200 may include at least one application processor (AP) 210, a communication module 220, at least one subscriber identity module (SIM) card slots 224_1~224_N, a memory 230, a sensor module 240, an input module 250, a display 260, an interface 270, an audio module 280, a camera module 291, a power management module 295, a battery 296, an indicator 297, and a motor 298.

The AP 210 may drive an operating system or an application program to control a plurality of hardware or software components connected to the AP 210, and may perform processing and operations of various data including multimedia data. The AP 210, for example, may be implemented as a system on chip (SoC). According to an embodiment, the AP 210 may further include a graphic processing unit (GPU) (not shown).

The communication module 220 (e.g., the communication interface 160) may perform data transmission/reception in communication with other electronic devices (e.g., the other electronic device 104 and the server 106) connected to the electronic device 200 (e.g., the electronic device 101) through a network. According to an embodiment, the communication module 220 may include a cellular module 221, a WiFi module 223, a BT module 225, a GPS module 227, an NFC module 228, and a radio frequency (RF) module 229.

The cellular module 221 may provide a voice call, a video call, an SMS service, an Internet service, and the like through a communication network (e.g., LTE, LTE-A, CDMA, WCDMA, UMTS, WiBro, or GSM). Also, the cellular module 221 may identify and authenticate an electronic device in a communication network by using, for example, a subscriber identification module (e.g., the SIM card). According to an embodiment, the cellular module 221 may perform at least some of the functions that may be provided by the AP 210. For example, the cellular module 221 may perform at least a multimedia control function.

According to an embodiment, the cellular module 221 may include a communication processor (CP). Further, the cellular module 221, for example, may be implemented as a SoC. Although the cellular module 221 (e.g., a CP), the memory 230, the power management module 295, and the like are shown as separate elements from the AP 210 in FIG. 2, the AP 210 may be implemented to include at least some (e.g., the cellular module 221) of the aforementioned elements according to an embodiment.

According to an embodiment, the AP 210 or the cellular module 221 (e.g., a CP) may load a command or data received from at least one of a non-volatile memory and other elements connected thereto into a volatile memory and process the loaded command or data. Further, the AP 210 or the cellular module 221 may store data received from or generated by at least one of other elements in a non-volatile memory.

Each of the WiFi module 223, the BT module 225, the GPS module 227, and the NFC module 228, for example, may include a processor for processing data transmitted or received through the corresponding module. Although the cellular module 221, the WiFi module 223, the BT module 225, the GPS module 227, and the NFC module 228 are shown as separate blocks in FIG. 2, at least some (e.g., two or more) of the cellular module 221, the WiFi module 223, the BT module 225, the GPS module 227, and the NFC module 228 may be included in one integrated chip (IC) or one IC package according to an embodiment. For example, at least some of processors corresponding to the cellular module 221, the WiFi module 223, the BT module 225, the GPS module 227, and the NFC module 228 respectively (e.g., a CP corresponding to the cellular module 221 and a WiFi processor corresponding to the WiFi module 223) may be implemented as one SoC.

The RF module 229 may perform data transmission/ reception, for example, RF signal transmission/reception. Although not shown in the drawing, the RF module 229, for example, may include a transceiver, a power amp module (PAM), a frequency filter, a low noise amplifier (LNA), and the like. Also, the RF module 229 may further include a component for transmitting/receiving an electromagnetic wave over the air in wireless communication, such as a conductor or a conducting wire. Although FIG. 2 shows that the cellular module 221, the WiFi module 223, the BT module 225, the GPS module 227, and the NFC module 228 share one RF module 229, at least one of the cellular module 221, the WiFi module 223, the BT module 225, the GPS module 227, and the NFC module 228 may perform RF signal transmission/reception through a separate RF module according to an embodiment.

The at least one SIM card 226_1 to 226_N may be a card including a subscriber identification module, and may be inserted into at least one slot 224_1 to 224_N formed in a certain position of the electronic device. The at least one SIM card 226_1 to 226_N may include unique identification information (e.g., integrated circuit card identifier (ICCID)) or subscriber information (e.g., international mobile subscriber identity (IMSI)).

The memory 230 (e.g., the memory 130) may include an internal memory 232 or an external memory 234. The internal memory 232, for example, may include at least one of a volatile memory (e.g., a dynamic RAM (DRAM), a static RAM (SRAM), or a synchronous dynamic RAM (SDRAM)) and a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a NAND flash memory, or an NOR flash memory).

According to an embodiment, the internal memory 232 may be a solid state drive (SSD). The external memory 234 may further include a flash drive, for example, a compact flash (CF), a secure digital (SD), a micro secure digital (Micro-SD), a mini secure digital (Mini-SD), an extreme digital (xD), or a memory stick. The external memory 234 may be functionally connected to the electronic device 200 through various interfaces. According to an embodiment, the electronic device 200 may further include a storage device (or storage medium) such as a hard drive.

The sensor module 240 may measure a physical quantity or detect an operation state of the electronic device 200 and convert the measured or detected information into an electronic signal. The sensor module 240, for example, may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green and blue (RGB) sensor), a biometric sensor 240I, a temperature/humidity sensor 240J, a light sensor 240K, and a ultraviolet (UV) sensor 240M. Additionally or alternatively, the sensor module 240, for example, may include an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris scanner (not shown), and/or a fingerprint sensor (not shown). The sensor module 240 may further include a control circuit for controlling one or more sensors included therein.

The input module 250 may include a touch panel 252, a (digital) pen sensor 254, a key 256, or an ultrasonic input unit 258. The touch panel 252 that recognizes a touch input, for example, may include at least one of a capacitive touch panel, a resistive touch panel, an infrared touch panel, and an acoustic wave touch panel. Also, the touch panel 252 may further include a control circuit. When the touch panel is a capacitive touch panel, it may recognize a physical contact or proximity. The touch panel 252 may also further include a tactile layer. In this case, the touch panel 252 may provide a tactile response to a user.

The (digital) pen sensor 254, for example, may be implemented using a unit identical or similar to a unit for receiving a touch input from a user or using a separate recognition sheet. The key 256, for example, may include a physical button, an optical key, or a keypad. The ultrasonic input unit 258 is a unit that may identify data by generating an ultrasonic signal through an input tool and detecting a sonic wave through a microphone (e.g., the microphone 688) in the electronic device 600, and is capable of wireless recognition. According to an embodiment, the electronic device 200 may also receive a user input from an external device (e.g., computer or server) connected thereto by using the communication module 220.

The display 260 (e.g., the display unit 150) may include a panel 262, a hologram unit 264, or a projector 266. The panel 262, for example, may be a liquid crystal display (LCD) or an active matrix-organic light emitting diode (AM-OLED). The panel 262, for example, may be implemented to be flexible, transparent, or wearable. The panel 262 may also be incorporated into one module together with the touch panel 252. The hologram unit 264 may show a stereoscopic image in the air by using light interference. The projector 266 may display an image by projecting light onto a screen. The screen, for example, may be located inside or outside of the electronic device 200. According to an embodiment, the display 260 may further include a control circuit for controlling the panel 262, the hologram unit 264, or the projector 266.

The interface 270, for example, may include a high-definition multimedia interface (HDMI) 272, a USB 274, an optical interface 276, or a D-subminiature (D-sub) 278. The interface 270, for example, may be included in the communication interface 160 shown in FIG. 1. Additionally or alternatively, the interface 290, for example, may include a mobile high-definition link (MHL) interface, a SD card/multimedia card (MMC) interface, or an infrared data association (IrDA) interface.

The audio module 280 may provide bidirectional conversion between a sound and an electronic signal. At least some elements of the audio module 280, for example, may be included in the input/output interface 140 shown in FIG. 1. The audio module 280, for example, may process sound information input or output through a speaker 282, a receiver 284, earphones 286, or the microphone 288.

The camera module 291 is a device that may take both still and moving images, and according to an embodiment, may include one or more image sensors (e.g., a front sensor or a rear sensor, not shown), a lens (not shown), an image signal processor (ISP) (not shown), or a flash (e.g., an LED or xenon lamp, not shown).

The power management module 295 may manage power of the electronic device 200. Although not shown, the power management module 295, for example, may include a power management integrated circuit (PMIC), a charger IC, or a battery or fuel gauge.

The PMIC, for example, may be mounted in an IC or an SoC semiconductor. Charging methods may be classified into wired charging and wireless charging. The charger IC may charge a battery, and may prevent an overvoltage or excess current from being induced or flowing from a charger. According to an embodiment, the charger IC may include a charger IC for at least one of the wired charging and the wireless charging. Examples of the wireless charging include magnetic resonance charging, magnetic induction charging, and electromagnetic charging, and an additional circuit such as a coil loop, a resonance circuit, and a rectifier may be added for the wireless charging.

The battery gauge, for example, may measure the residual capacity, charge in voltage, current, or temperature of the battery 296. The battery 296 may store or generate electricity, and may supply power to the electronic device 200 by using the stored or generated electricity. The battery 296, for example, may include a rechargeable battery or a solar battery.

The indicator 297 may display a specific status of the electronic device 200 or a part thereof (e.g., the AP 210), for example, a boot-up status, a message status, or a charging status. The motor 298 may convert an electrical signal into a mechanical vibration. Although not shown, the electronic device 200 may include a processing unit (e.g., GPU) for supporting a mobile TV. The processing unit for supporting a mobile TV may process media data pursuant to a certain standard, for example, digital multimedia broadcasting (DMB), digital video broadcasting (DVB), or media flow.

Each of the above described elements of the electronic device according to the present disclosure may be formed by one or more components, and the names of the corresponding elements may vary according to the type of the electronic device. The electronic device according to the present disclosure may include at least one of the above described elements, and may exclude some of the elements or further include other additional elements. Further, some of the elements of the electronic device according to the present disclosure may be coupled to form a single entity while performing the same functions as those of the corresponding elements before the coupling.

The term "module" as used in the present disclosure, for example, may mean a unit including one of hardware, software, and firmware or any combination of two or more of them. The "module", for example, may be interchangeable with the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing certain operations, which are now known or will be developed in the future.

According to various embodiments of the present disclosure, an electronic device input system may include an electronic device 200 and an input device configured to provide an input to the electronic device 200. An example of an input device is a pen type input device configured to enable a user to provide an input by grasping the input device as if the user writes.

According to various embodiments of the present disclosure, the input device may include a pen and at least one detachable drawing unit attached to the pen so as to provide various writing feelings to the user. The detachable drawing unit may be various in type, shape, size and material depending on various embodiments thereof, and may be attached to the pen in various ways.

FIGS. 3A to 3D are views exemplifying an input device according to an embodiment of the present disclosure.

Referring to FIGS. 3A to 3D, according to an embodiment, an input device may include a pen 310 and a case-type drawing unit 320 as an example of the detachable drawing unit.

Figure 3A:
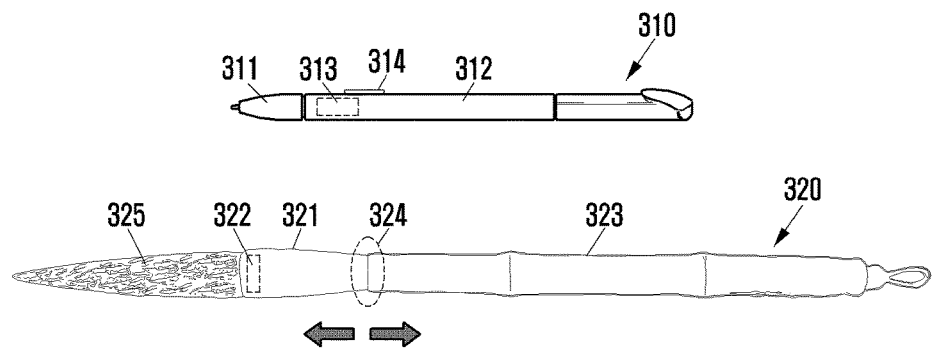
FIGS. 3A, 3B, 3C, and 3D are views exemplifying an input device according to an embodiment of the present disclosure.

Referring to FIG. 3A, according to an embodiment, the pen 310 may include a pen point portion 311 and a pen holder portion 312. Also, an input reactor 313 configured to provide an input signal to the electronic device 200 may be provided within the pen 310. The touch panel 252 of the electronic device 200 may receive an input from the input reactor 313 so as to generate an input signal. The electronic device 200 may receive a touch input or proximity input provided by the input reactor 313. For example, the input reactor 313 may include a resonance screen configured to induce an electromagnetic field on the touch panel 252. In addition, the pen 310 may further include an activator 314. When the activator 314 is activated, an input of another attribute may be provided to the electronic device 200, for example, in a manner of controlling a physical attribute of the electromagnetic field (e.g., strength or frequency).

According to an embodiment, the case-type drawing unit 320 may include an input unit 321 including a drawing contact unit 325 such as a brush, and a support portion 323 coupled with the input unit 321 and used as the user's support unit. The input unit 321 may cover the pen point portion 311 of the pen 310. The input unit 321 may include drawing contact units 325 of various types, shapes, sizes or material characteristics. The various drawing contact units 325 may provide the user with various writing feelings. The support portion 323 may cover the pen holder portion 312 of the pen 310.

The input unit 321 and the support portion 323 may be coupled with each other at a coupling region 324 in various manners.

Figure 3B:
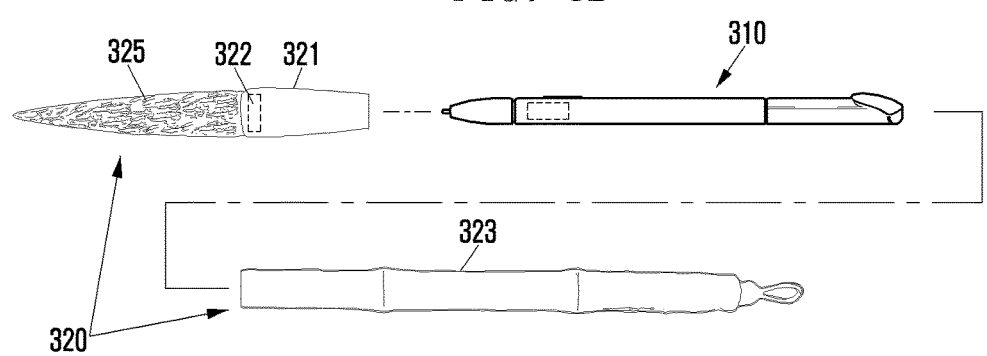
Figure 3C:
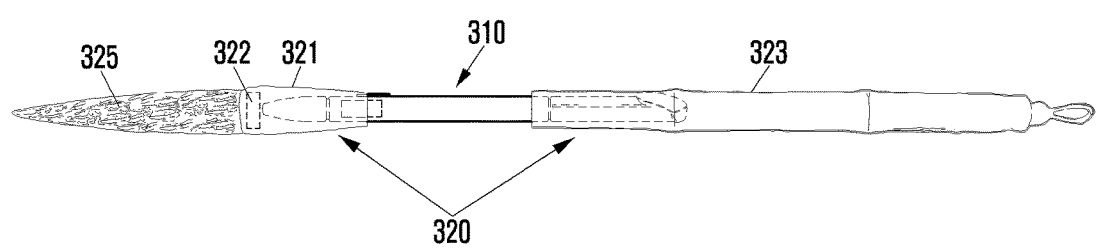
Figure 3D:
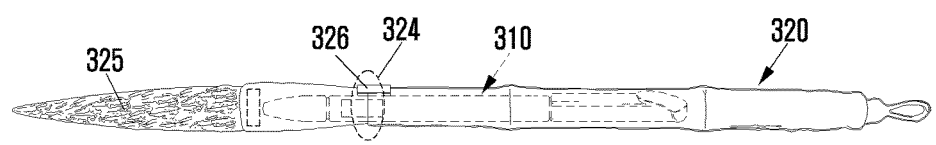

Referring to FIGS. 3B, 3C, and 3D, the input unit 321 and the support portion 323 of the case-type drawing unit 320 may be separated from each other, and the pen 310 may be inserted into a space therebetween when they are separated from each other. The input unit 321 may cover the pen point portion 311, and the support portion 323 may cover the pen holder portion 312.

According to an embodiment, the case-type drawing unit 320 may further include a button unit 326 so that the user may activate the activator 314 even after the case-type drawing unit 320 covers the pen 310. The button unit 326 may be formed at a position corresponding to the activator 314 of the pen 310 covered by the case-type drawing unit 320.

Meanwhile, a communication chip 322, for example, a short distance communication chip may be included in the drawing unit so as to store related information of each drawing unit and to transmit the related information to the electronic device 200. For example, the communication chip 322 may be inserted into the inside of the input unit 321 of the case-type drawing unit 320. The related information of the drawing unit may be, for example, unique ID information of the corresponding drawing unit. The unique ID of the drawing unit may be set to be varied depending on the type, shape, size or material characteristic of the drawing contact unit 325. The communication chip 322 may transmit the unique ID of the corresponding drawing unit to the electronic device 200, and the electronic device 200 may confirm the attribute of the drawing unit corresponding to the received unique ID. The electronic device 200 may output a drawing expression corresponding to a received drawing input, based on the determined attribute of the drawing unit.

Figure 4:
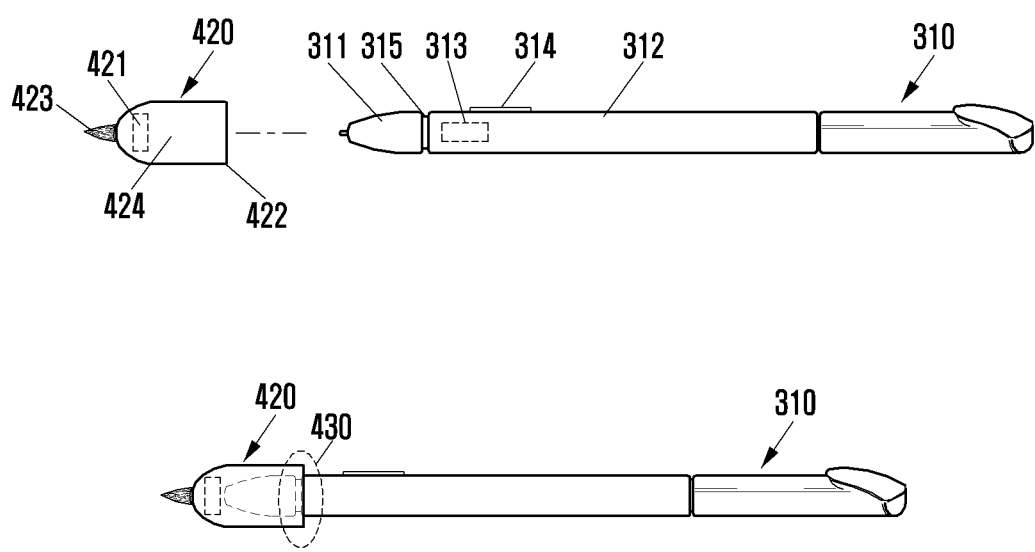
FIG. 4 is a view exemplifying an input device according to another embodiment of the present disclosure.

FIG. 4 is a view exemplifying an input device according to another embodiment of the present disclosure Referring to FIG. 4, according to another embodiment, an input device may include a pen 310 and a cap-type drawing unit 420 as an example of the detachable drawing unit.

As illustrated in FIGS. 3A to 3C, the pen 310 may include a pen point portion 311, a pen holder portion 312, an input reactor 313, and an activator 314. In addition, the pen 310 may further include a groove 315 for attaching the cap-type drawing unit 420. The groove 315 may be formed on an area where the pen point portion 311 and the pen holder portion 312 are coupled with each other.

According to an embodiment, the cap-type drawing unit 420 may include a drawing contact unit 423 such as a brush, and a main body 424 configured to cover the pen point portion 311 of the pen 310. The main body 424 may include a operation 422 formed thereon to be accommodated to the groove 315 formed on the pen 310. When the operation 422 of the cap-type drawing unit 420 is accommodated in the groove 315 of the pen 310, the cap-type drawing unit 420 may be fixed to the pen 310. Besides, the pen 310 and the cap-type drawing unit 420 may be coupled with each other in a coupling region 430 in various ways.

As illustrated in the embodiment of FIGS. 3A to 3C, the cap-type drawing unit 420 may include a communication chip 421, such as a short distance communication chip, configured to related information of respective drawing unit and to transmit the related information to the electronic device 200.

Figure 5A:
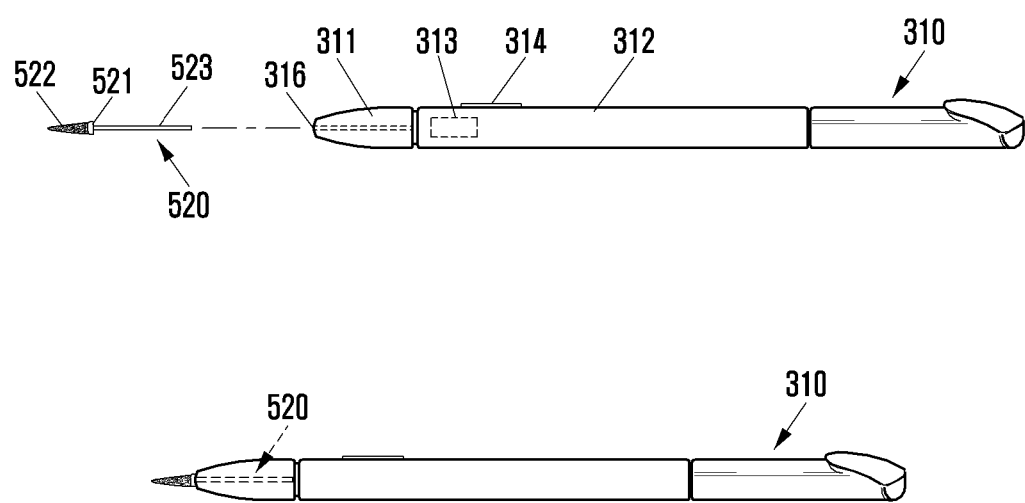
FIG. 5A is a view exemplifying an input device according to an embodiment of the present disclosure.

FIG. 5A is a view exemplifying an input device according to still another embodiment of the present disclosure.

Referring to FIG. 5A, according to still another embodiment, an input device may include a pen 310, and a tip-exchangeable drawing unit 520 as an example of the detachable drawing unit.

As illustrated in FIGS. 3A to 3D, the pen 310 may include a pen point portion 311, a pen holder portion 312, an input reactor 313, and an activator 314. In addition, the pen 310 may further include a reception unit 316 configured to receive the tip-exchangeable drawing unit 520. The reception unit 316 may be formed inside the pen point portion 311 of the pen 310.

According to an embodiment, the tip-exchangeable drawing unit 520 may include a drawing contact unit 522, such as a brush, and an insertion portion 523 inserted into the reception unit 316 of the pen 310. In addition, the tip-exchangeable drawing unit 520 may further include a shoulder 521 acting as a locking operation at the time of insertion.

According to an embodiment of the present disclosure, the pen 310 may include a communication chip (not illustrated), such as a short distance communication chip. The pen 310 may detect the inserted tip-exchangeable drawing unit 520 through, for example, a sensor unit (not illustrated). In addition, based on a sensed result, the pen 310 may confirm the unique information of the corresponding tip-exchangeable drawing unit 520, and transmit the confirmed information to the electronic device 200 through the communication chip. According to another embodiment, the tip-exchangeable drawing unit 520 may include a communication chip (not illustrated), such as a short distance communication chip, configured to store the unique information and to transmit the information to the electronic device 200.

FIGS. 5B to 5E are views exemplifying an input device including a tip storage unit 530 according to an embodiment of the present disclosure.

Figure 5B:
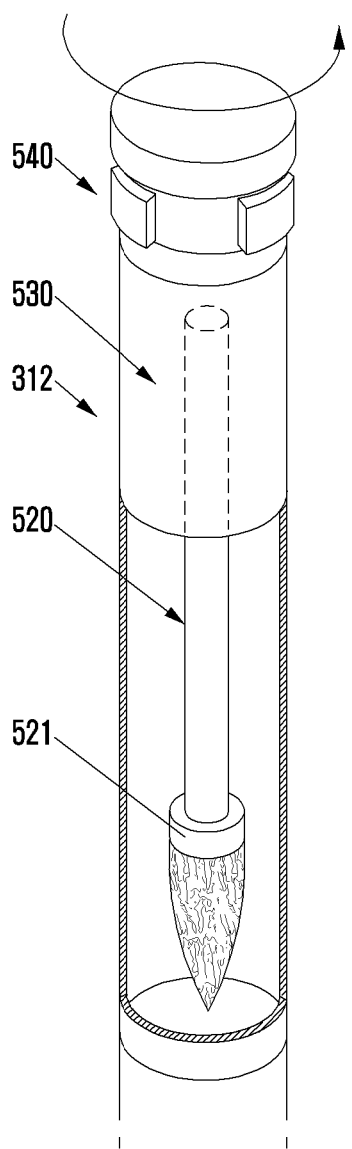
FIGS. 5B, 5C, 5D, and 5E are views exemplifying an input device including a tip storage unit according to an embodiment of the present disclosure.

Referring to FIG. 5B, a tip removing unit 540 may be included on the tip end of the pen holder portion 312 of the pen 310. The tip removing unit 540 may form a single body with the pen holder portion 312 to be separated in various ways. For example, as illustrated in the drawing, the tip removing unit 540 may be separated in a screw manner. The pen holder portion 312 may be provided with a tip storage unit 530 configured to store the tip-exchangeable drawing unit 520 therein when the tip removing unit 540 is separated.

Figure 5C:
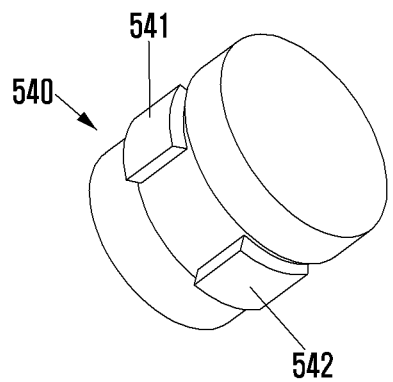
Figure 5D:
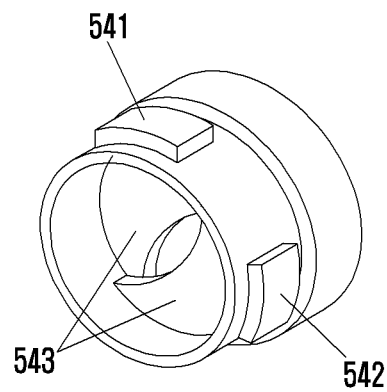
Figure 5E:
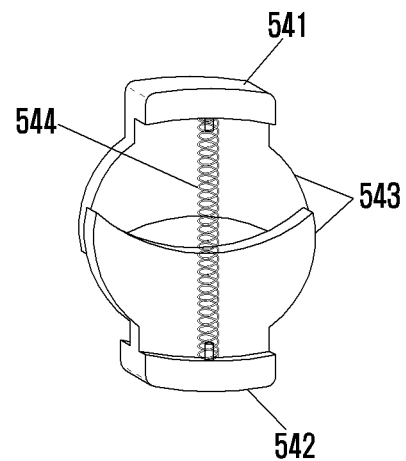

Referring to FIGS. 5C, 5D, and 5E, the separated tip removing unit 540 may be used for removing the tip-exchangeable drawing unit 520 inserted into the reception unit 316 of the pen 310. For example, when the user introduce the shoulder 521 of the tip-exchangeable drawing unit 520 into a space between tongs 543 and then pushes first and second buttons 541 and 542, the tongs 543 may be fixed to the shoulder 521. Then, when the tip-exchangeable drawing unit 520 is pulled out from the reception unit 316, the tip-exchangeable drawing unit 520 may be separated from the pen 310. For example, the first and second buttons 541 and 542 may be formed to push the tongs 543, respectively, and a spring 544 may be mounted so as to elastically bias the tongs 543. The tip-exchangeable drawing unit 520 separated from the reception unit 316 of the pen 310 may be stored in the tip storage unit 530 formed in the pen holder portion 312 of the pen 310.

Figure 6:
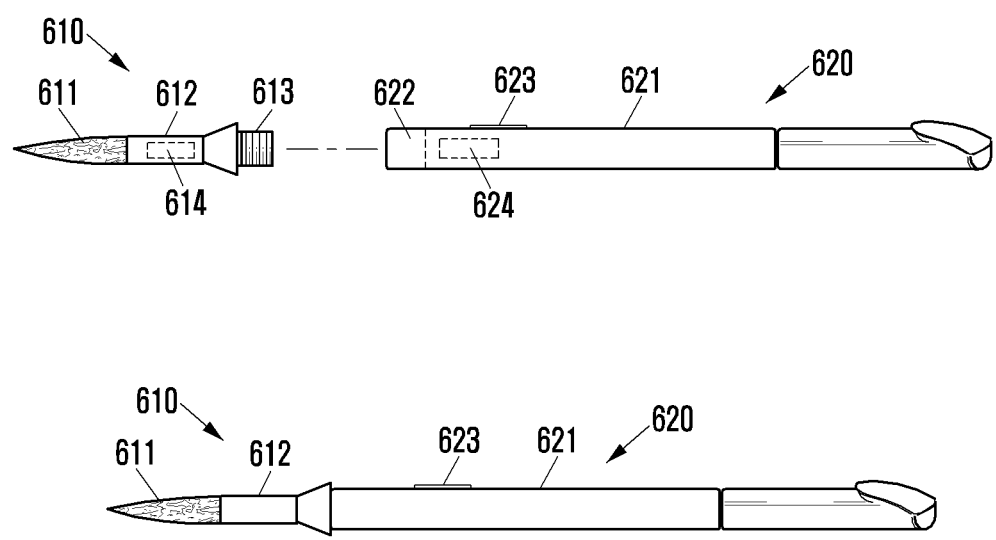
FIG. 6 is a view exemplifying an input device according to an embodiment of the present disclosure.

FIG. 6 is a view exemplifying an input device according to yet another embodiment of the present disclosure.

Referring to FIG. 6, an input device may include a body 620, and a head-exchangeable tip 610 including a drawing contact unit 611 and connected to the body 620.

According to an embodiment, the body 620 may include a support portion 621, and an input reactor 624 within the support portion 621. The touch panel 252 of the electronic device 200 may receive an input provided by the input reactor 624 to generate an input signal. The electronic device 200 may receive a touch input or proximity input by the input reactor 624. For example, the input reactor 624 may include a resonance screen configured to induce an electromagnetic field to the touch panel 252. In addition, the body 620 may further include an activator 623. When the activator 623 is activated, an input of another attribute may be provided to the electronic device 200, for example, in a manner of adjusting the physical attribute (e.g., strength or frequency) of the electromagnetic field. The body 620 may further include a body coupling portion 622 to be coupled with the head-exchangeable tip 610.

According to an embodiment, the head-exchangeable tip 610 may include a drawing contact unit 611, such as a brush, as an example of the drawing unit, a tip coupling portion 613 configured to be coupled with the body, and a connection portion 612 connecting the drawing contact unit 611 and the tip coupling portion 613. The head-exchangeable tip 610 may include various drawing contact units 611 of various types, shapes, sizes or material characteristics. Various drawing contact units 611 may provide the user with various writing feelings.

The head-exchangeable tip 610 may include a communication chip 614, such as a short distance communication chip, configured to store related information of respective drawing unit and to transmit the related information to the electronic device 200. The related information of the drawing unit may be, for example, unique ID of the corresponding drawing unit. The unique ID of the drawing unit may be set to be varied depending on a type, shape, size or material characteristic of the drawing contact unit 611.

FIGS. 7A to 7D are views exemplifying a drawing contact unit according to various embodiments of the present disclosure.

Figure 7D:
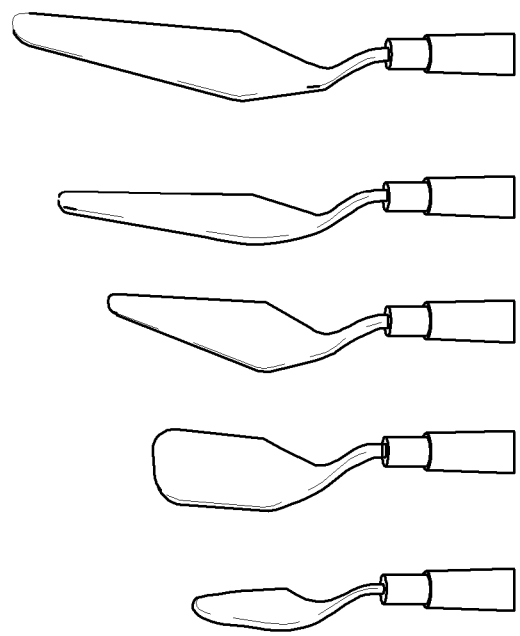
FIGS. 7A, 7B, 7C, and 7D are views exemplifying a drawing contact unit according to various embodiments of the present disclosure.
Figure 7C:
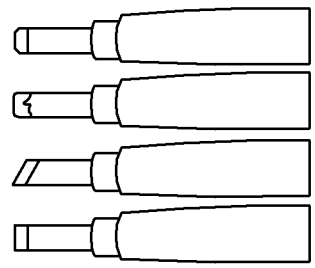
Figure 7B:
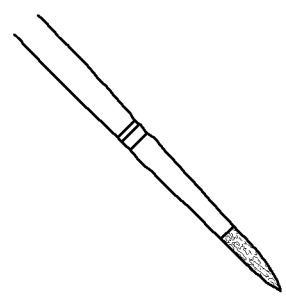
Figure 7A:
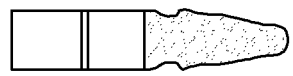

Referring to FIGS. 7A to 7D, the drawing contact units 325, 423, 522, and 611 may be configured in various types, and may have various shapes, sizes or material characteristics, as illustrated. For example, the drawing contact units may be a stylus pen type as illustrated in FIG. 7A, a brush type as illustrated in FIG. 7B, a graver type as illustrated in FIG. 7C, or an oil painting knife type as illustrated in FIG. 7D. Even in the same type, the drawing contact units may have different shapes or sizes as illustrated in FIGS. 7C and 7D. The drawing contact units may be formed of different materials, depending on the types thereof.

The unique information of the drawing unit may include a unique ID of the corresponding drawing unit. The electronic device 200 may receive the unique ID of the corresponding drawing unit so as to determine the attribute of the drawing contact unit corresponding to the unique ID. Alternatively, the electronic device 200 may receive information related to the type, shape, size or material characteristic of the drawing contact unit together with the unique ID, and may determine the attribute of the drawing contact unit using the received information.

Figure 8:
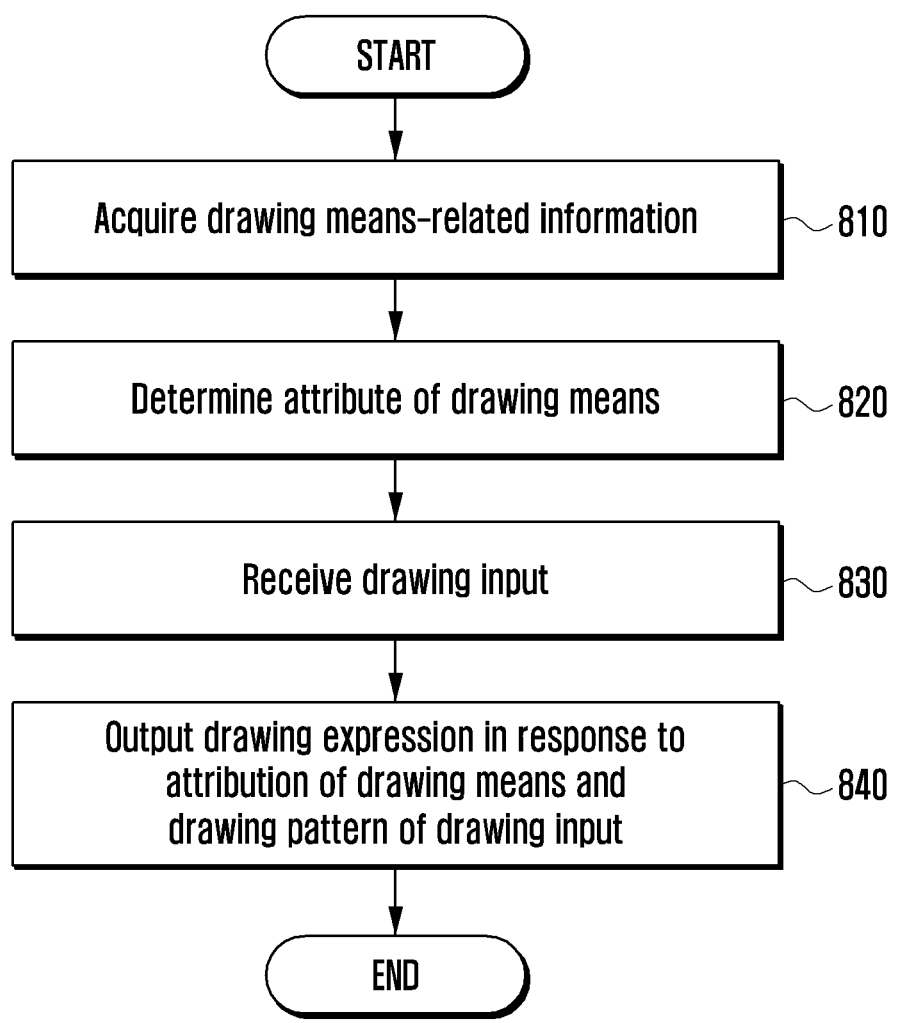
FIG. 8 is a flowchart illustrating an input method of an electronic device according to an embodiment of the present disclosure.

FIG. 8 is a flowchart illustrating an input method of an electronic device 200 according to an embodiment of the present disclosure.

Referring to FIG. 8, in operation 810, the electronic device 200 may acquire drawing unit-related information. The electronic device 200 may acquire the drawing unit-related information through, for example, the user's input through an input module. In addition, the electronic device 200 may receive the related information transmitted by the input device including the drawing unit through a communication module. As an embodiment, the drawing unit-related information may be transmitted from the pen within the input device to the electronic device 200. When the drawing unit attached to the pen is changed, the pen may store the drawing unit-related information in a manner or sensing the corresponding drawing unit or updating the drawing unit-related information according to the user's input. As another embodiment, the drawing unit-related information may be transmitted from the drawing unit attached to the pen to the electronic device 200. Each drawing unit may store the corresponding drawing unit-related information. That is, at least one of the pen and drawing unit may include a communication chip, such as a short distance communication chip, configured to store and transmit drawing unit-related information.

According to an embodiment, the related information may include unique ID information of the drawing unit, as discussed above. In addition, according to an embodiment, the related information may include a type, shape, size or material characteristic of the drawing contact unit together with the unique ID of the drawing unit. For example, when the drawing unit is attached to the pen and/or when the drawing unit approaches the electronic device 200 within a predetermined distance, the electronic device 200 may receive the related information of the corresponding drawing unit from the input device. In operation 820, the electronic device 200 may determine the attribute of the drawing unit based on the acquired related information of the drawing unit. For example, the electronic device 200 may store attribute information of the drawing unit corresponding to the unique ID information of the drawing unit. Accordingly, the attribute of the drawing unit may be determined in a manner of confirming the attribute information of the drawing unit corresponding to the acquired ID information. The attribute of the drawing unit may include at least one of information items related to a type, shape, size and material of the drawing contact unit.

In operation 830, the electronic device 200 may receive a drawing input from the user through the input device, to which the drawing unit is attached. The user may generate various types of drawing patterns on the touch panel 252 of the electronic device 200 using the input device.

In operation 840, the electronic device 200 may output a drawing expression on the display thereof in response to the attribute of the drawing unit and the drawing pattern of the drawing input. That is, the electronic device 200 may generate the drawing expression corresponding to the drawing pattern, and may determine the attribute of the drawing expression according to the determined attribute of the drawing unit.

Figure 9A:
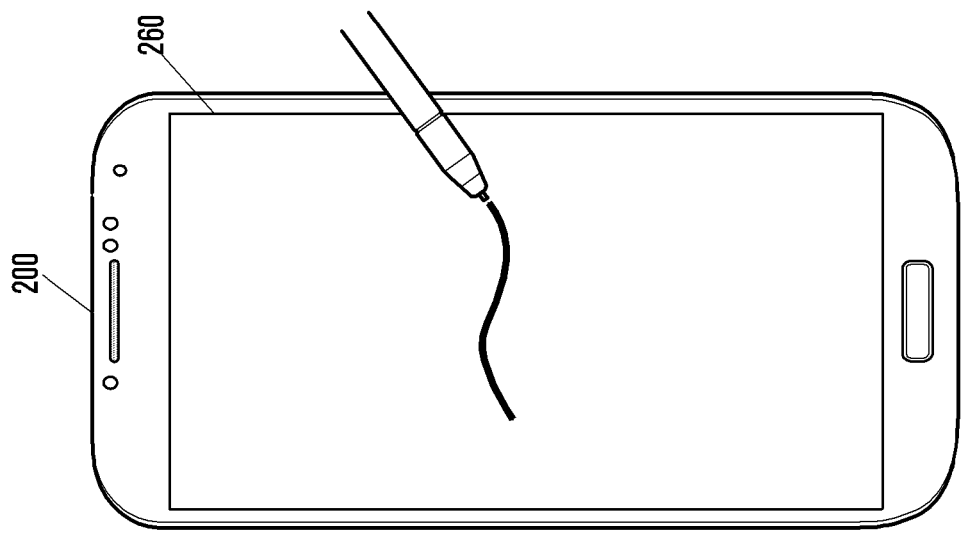
FIGS. 9A and 9B are views illustrating a screen representing an input operation of an electronic device according to various embodiments of the present disclosure.
Figure 9B:
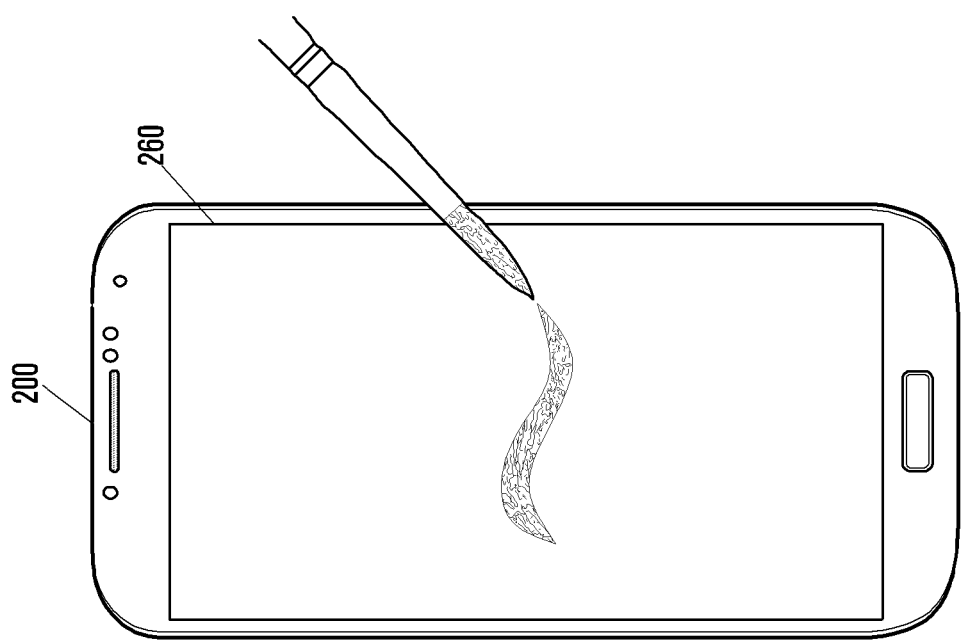

FIGS. 9A and 9B are views illustrating a screen representing an input operation of an electronic device according to various embodiments of the present disclosure.

Referring to FIG. 9A, when a drawing input is received by the electronic device 200 through a brush-type drawing unit, the electronic device 200 may output a drawing expression, which looks as thought the drawing expression were drawn by a practical brush, through the display 260. Whereas, when a drawing input is received by the electronic device 200 through a stylus pen-type drawing unit as in FIG. 9B, the electronic device 200 may output a drawing expression, which looks as though the drawing expression were drawn by a practical pen, through the display 260. That is, the electronic device 200 may determine the attribute of the drawing expression according to the attribute of the drawing unit.

Figure 10:
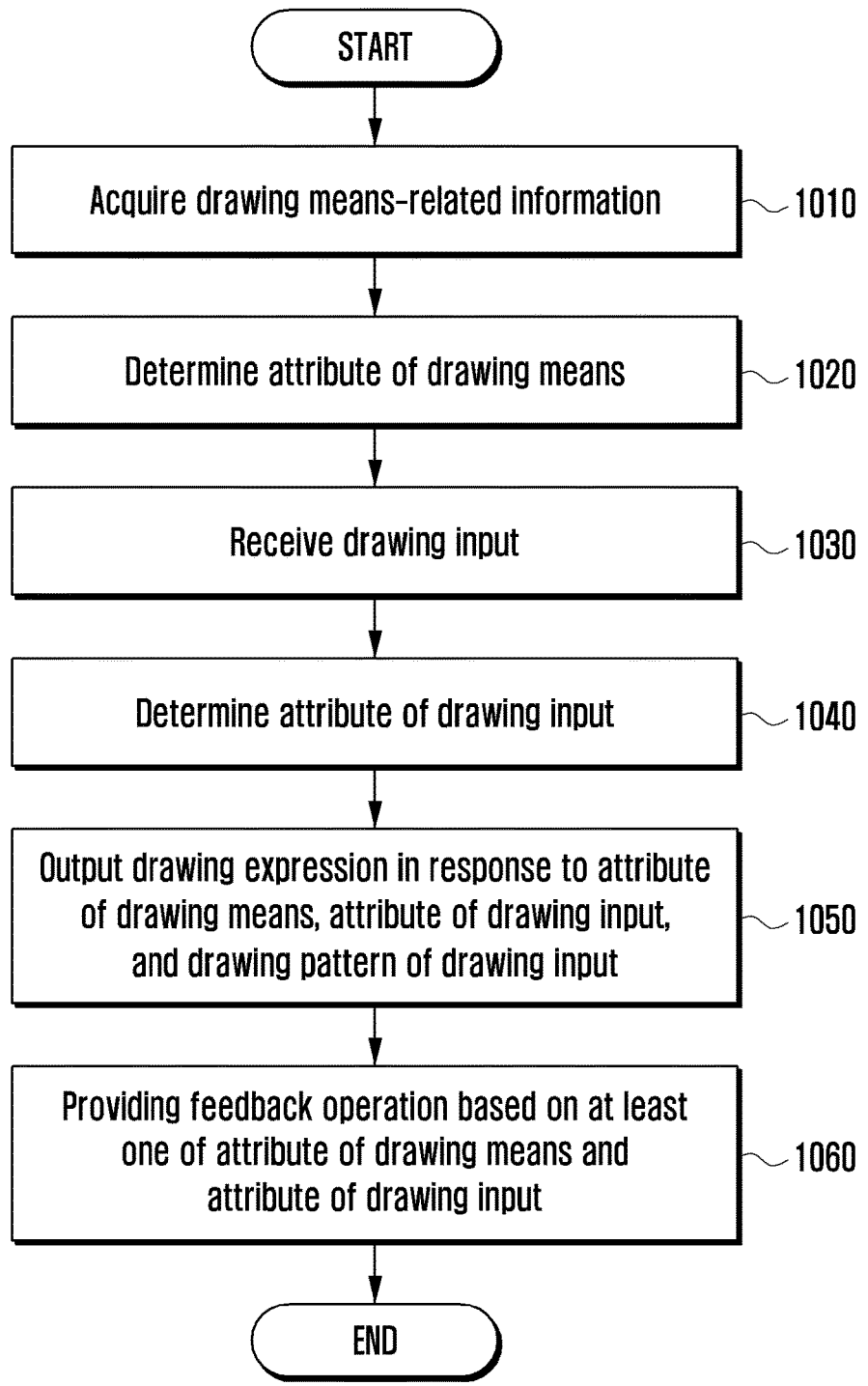
FIG. 10 is a flowchart illustrating an input method of an electronic device according to another embodiment of the present disclosure.

FIG. 10 is a flowchart illustrating an input method of an electronic device according to another embodiment of the present disclosure.

In operation 1010, the electronic device 200 may acquire drawing unit-related information. The electronic device 200 may acquire the drawing unit-related information through the user input through, for example, an input module. In addition, the electronic device 200 may receive related information transmitted by an input device including the drawing unit through a communication module. Detailed contents for the related information acquisition are the same as those described in operation 810 in FIG. 8.

In operation 1020, the electronic device 200 may determine the attribute of the drawing unit based on the acquired drawing unit-related information. For example, the electronic device 200 may store the attribute information of the drawing unit corresponding to the unique ID information of the drawing unit. Accordingly, the electronic device 200 may determine the attribute of the drawing unit in a manner of confirming the attribute information of the drawing unit corresponding to the acquired ID information. The attribute of the drawing unit may include at least one of information items related to a type, shape, size, and material of the drawing contact unit.

In operation 1030, the electronic device 200 may receive a drawing input from the user through the input device, to which the drawing unit is attached. The user may generate various types of drawing patterns on the touch panel 252 of the electronic device 200 using the input device.

In operation 1040, the electronic device 200 may determine the attribute of the received drawing input. The drawing input may include a direct touch input and a proximity input in relation to the touch panel 252. When the detachable drawing unit is attached, the electronic device 200 may receive the drawing input by, for example, the proximity input. This is because a space is formed by the drawing unit between the input reactor and the touch panel 252.

The attribute of the drawing input, for exmaple, the attribute of the proximity input may include at least one information item among a proximity distance, a moving speed, an elapsed time after inputting, the movement progressing direction, the number of inputting times, and a stopping duration of the proximity input, and a surface material virtually set on the touch panel 252. Various drawing patterns may be generated when drawing is performed on rice paper using a practical brush. The attribute of the proximity input includes elements corresponding to factors of determining the drawing pattern. Since the attribute of the proximity input is instantly changed at every time point, the electronic device 200 may determine the attribute of the received proximity input in real time.

In operation 1050, the electronic device 200 may output a drawing expression on the display in response to the attribute of the drawing unit, the attribute of the drawing input, and the drawing pattern of the drawing input. That is, the electronic device 200 may generate a drawing expression corresponding to the drawing pattern, and may determine the attribute of the drawing expression according to the attribute of the drawing unit and the attribute of the drawing input determined as described above. Specific contents thereof will be described with reference to FIGS. 11 to 13.

In operation 1060, the electronic device 200 may provide the user with a feedback operation corresponding to the drawing input based on at least one of the attribute of the drawing unit and the attribute of the drawing input. The feedback operation may include at least one of vibration, attraction, and sound.

For example, when a graver-type drawing unit is selected as the drawing unit, the electronic device 200 may operate a vibration device such that a writing feeling of a practical graver may be transmitted to the user. At this time, for example, the magnitude and frequency of the vibration may be adjusted according to the attribute of the drawing input.

When a rubber-type drawing unit is selected as the drawing unit, attraction using an electromagnet may be generated so that a frictional force of practical rubber may be transmitted to the user. At this time, the electromagnet may be included in each of the input device and the electronic device 200. For example, the magnitude of the attraction may be adjusted according to the attribute of the drawing input.

Furthermore, the electronic device 200 may provide sounds corresponding to various drawing unit through a speaker. For example, the volume and frequency may be adjusted according to the attribute of the drawing input.

Figure 11:
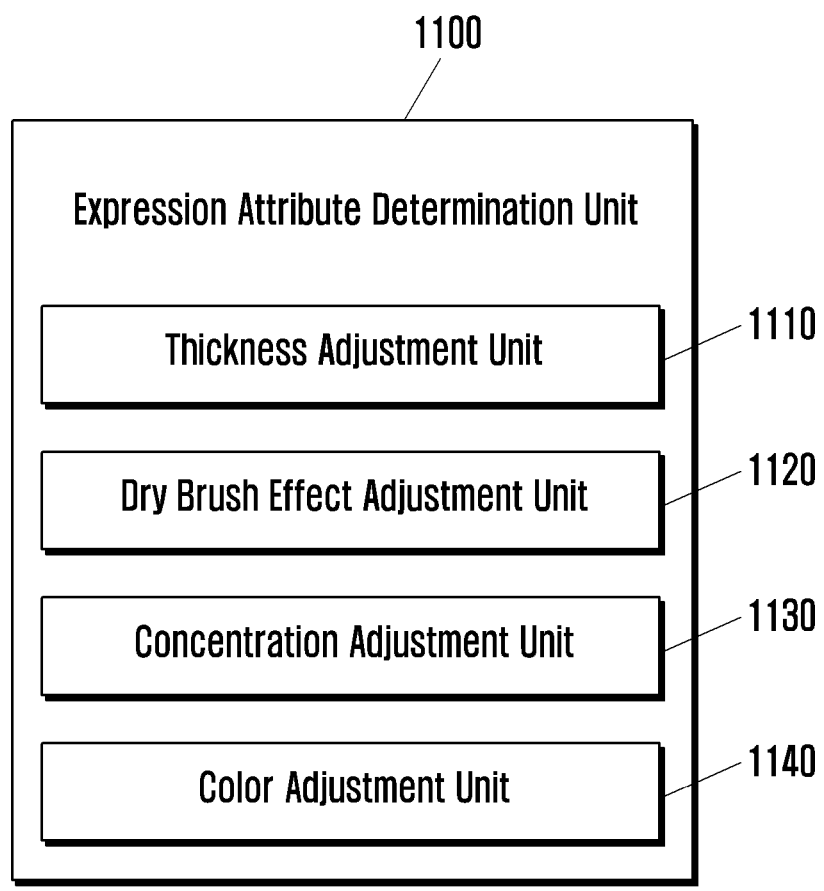
FIG. 11 is a view illustrating a configuration of an expression attribute determination unit of an electronic device according to an embodiment of the present disclosure.

FIG. 11 is a view illustrating a configuration of an expression attribute determination unit of an electronic device according to an embodiment of the present disclosure electronic device.

Referring to FIG. 11, as discussed above with reference to FIG. 10, the electronic device 200 may determine the attribute of a drawing expression based on the attribute of the drawing unit and the attribute of a drawing input. An expression attribute determination unit 1100 may determine the attribute of the drawing expression to be provided on the display based on the attribute of the drawing unit and the attribute of the drawing input.

For example, the expression attribute determination unit 1100 may determine a basic drawing expression type according to the attribute of the drawing unit, and determine the final drawing expression type according to the attribute of the received drawing input. For example, when a distance attribute of a proximity input is determined as being relatively close, the drawing expression to be output may be formed relatively thickly. The expression attribute to be determined may include at least one of the thickness of a drawing expression to be output, a dry brush effect, a concentration, and a color.

Referring to FIG. 11, specifically, the expression attribute determination unit 1100 may include a thickness adjustment unit 1110, a dry brush effect adjustment unit 1120, a concentration adjustment unit 1130, and a color adjustment unit 1140.

The thickness adjustment unit 1110 may adjust the thickness of the drawing expression to be output based at least one of the type, shape, and material of the drawing unit, and the proximity distance of the proximity input. For example, when a brush-type drawing unit is used, the thickness of the drawing expression may be controlled to non-linearly increase as the proximity distance of the proximity input is reduced.

Figure 12:
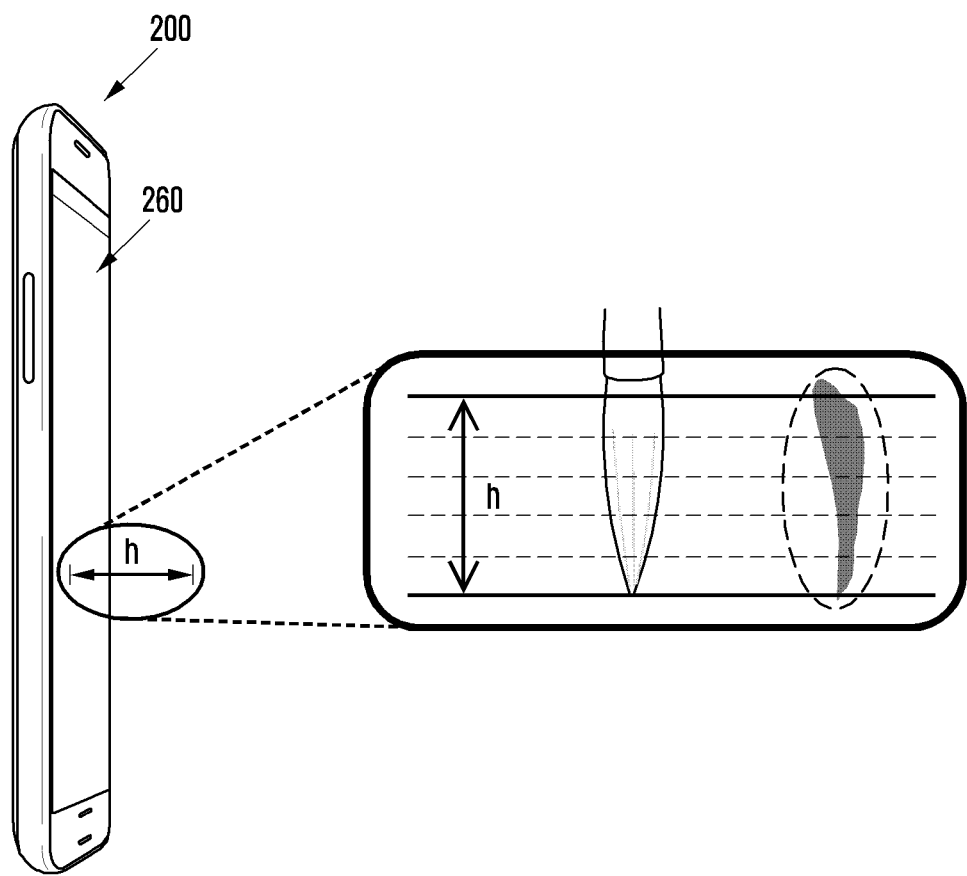
FIG. 12 is a view illustrating an embodiment of an electronic device input system for describing an operation of a thickness adjustment unit according to an embodiment of the present disclosure.

FIG. 12 is a view illustrating an embodiment of an electronic device input system for describing an operation of a thickness adjustment unit according to an embodiment of the present disclosure.

Referring to FIG. 12, the distance attribute of the proximity input may be changed according to the degree of contact of the drawing unit of the input device on the display 260 of the electronic device 200. When the drawing unit is a brush-type and a vertical stroke is drawn with the brush, the distance of the proximity input may be short and then may be gradually increase. At this time, the thickness adjustment unit 1110 may non-linearly increase the thickness of the drawing expression as the distance of the proximity input is short like the vertical stroke illustrated in the drawing. That is, the thickness of the drawing expression may be non-linearly adjusted as in the case where drawing is performed using a practical brush. In other words, when the length h of the portion of the drawing unit of the input device in contact with the display 260 is long, the thickness of the drawing expression is thick, and as the length h is reduced, the thickness of the drawing expression may be non-linearly reduced. In addition, the thickness adjustment unit 1110 adjusts the thickness of the drawing expression in consideration of various factors. Thus, the thickness of the drawing expression to be output may be adjusted to be similar to a practical writing feeling.

The dry brush effect adjustment unit 1120 may adjust the dry brush effect of the drawing expression to be output based on at least one of the type, shape, size, and material of the drawing unit, and the moving speed, an elapsed time after inputting, and movement progressing direction of the proximity input. For example, the dry brush effect adjustment unit 1120 increases the dry brush effect of the drawing expression as the moving speed of the proximity input increases.

Figure 13A:
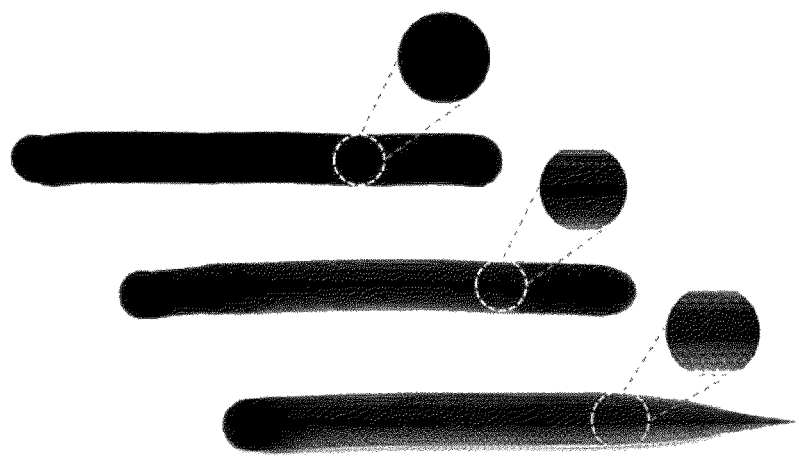
FIGS. 13A, 13B, and 13C are views exemplifying an implementation of drawing by a dry brush effect adjustment unit according to an embodiment of the present disclosure.
Figure 13B:
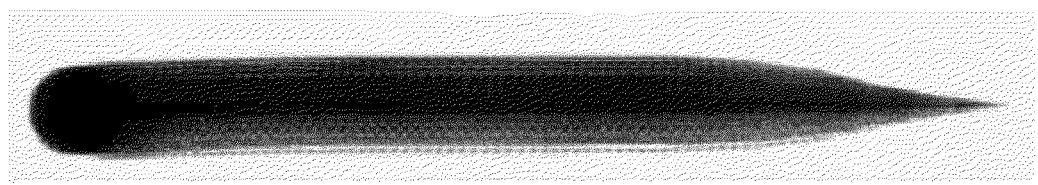
Figure 13C:
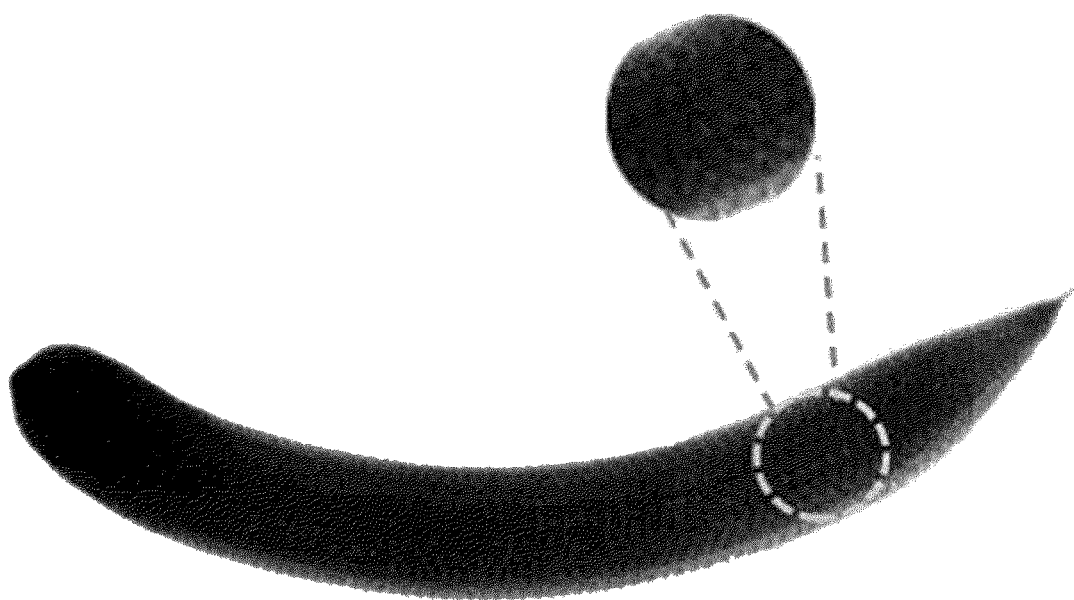

FIGS. 13A, 13B, and 13C are views exemplifying an implementation of drawing by a dry brush effect adjustment unit according to an embodiment of the present disclosure.

Referring to FIG. 13A, among three strokes, the drawing speed of the highest stroke is the slowest and the drawing speed of the lowest stroke is the fastest. Thus, the dry brush effect of the drawing expression increases toward the lowest stroke.

In addition, the dry brush effect adjustment unit 1120 determines the elapsed time after inputting, and as the elapsed time after the drawing is initiated increases, the dry brush effect adjustment unit 120 increases the dry brush effect.

Referring to FIG. 13B, the stroke progresses from left to right. Thus, the dry brush effect of the drawing increases toward the right side of the stroke.

Furthermore, the dry brush effect adjustment unit 1120 may adjust the dry brush effect of the drawing according to the progressing direction of the movement of the proximity input.

Referring to FIG. 13C, when the proximity input is in a curved direction, a control may be performed such that the dry brush effect is high in the outside of the curve compared to the inside of the curve.

The concentration adjustment unit 1130 may adjust the concentration or spreading degree of the output drawing expression based on at least one of the type, shape, size, and material of the drawing unit, the number of inputting times, movement progressing direction, and stopping duration of the proximity input, and the surface material virtually set on the touch panel 252. For example, the concentration adjustment unit 1130 may adjust the concentration of the drawing output such that when the drawing unit of the input device (e.g., brush type) is dipped in, for example, India ink or paint and then performs a first input, the concentration of the drawing output is the thickest and then the concentration of the drawing output is reduced as the number of inputting times increases.

In addition, when there is a clear turn in movement progressing path of the proximity input, the concentration adjustment unit 1130 may adjust the concentration to be thickened and the spreading degree to be somewhat increased at the turning node. Furthermore, when the proximity input stays at the same location for an increased length of time, the concentration adjustment unit may perform a control such that the concentration is thickened and the spreading effect is increased in the corresponding portion. Moreover, the concentration adjustment unit 1130 may also adjust the concentration and spreading effect of the drawing according to the type of surface material which is virtually set on the touch panel 252 of the electronic device. In addition, the concentration adjustment unit 130 may change the concentration and spreading effect of the drawing output according to various proximity input attributes. Also, when an input instrument is provided with a button, such as an activator, the concentration adjustment unit 1130 may adjust the concentration of the output drawing based on the activated state of the activator.

The color adjustment unit 1140 may adjust an output drawing color based on the proximity distance of the proximity input or the state of the input device. When the color adjustment unit 1140 is set such that different colors are selected for respective sections of the proximity distance according to the user's setting, the color adjustment unit 1140 may adjust the output drawing colors according to the proximity distance of the input device at the time of subsequent drawing. In addition, when the input instrument is provided with a button, such as an activator, the color adjustment unit 1140 may adjust the output drawing colors based on the activated state of the activator. The color adjustment unit 1140 may set the colors as a single color and may also support a function of adjusting the concentration of the single color.

Figure 14:
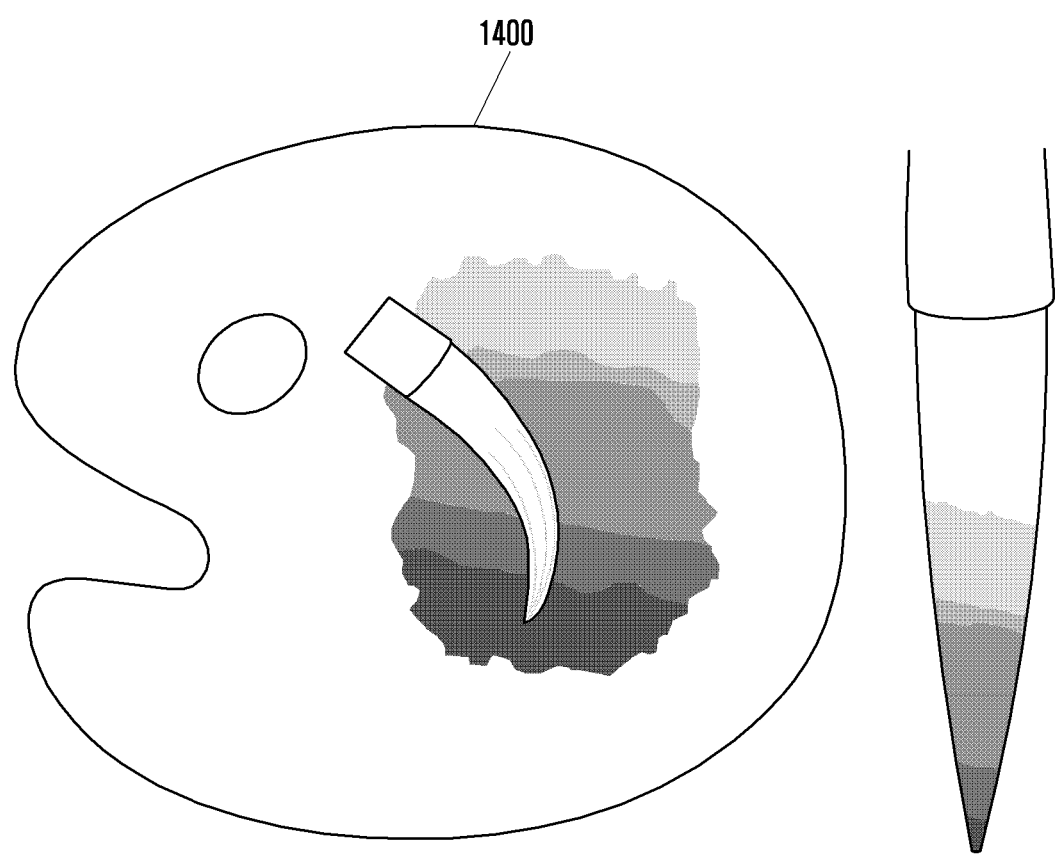
FIG. 14 is a view illustrating an embodiment of an electronic device input system according to an embodiment of the present disclosure.

FIG. 14 is a view illustrating an embodiment of an electronic device input system according to an embodiment of the present disclosure.

Referring to FIG. 14, in addition, the color adjustment unit 1140 may virtually set one or more colors in the drawing unit of the input device by providing a color selection setting function. For example, when a palette 1400 including one or more colors is provided on the display of the electronic device 200, the colors may be set in the input instrument in a manner of causing the input device of the drawing unit to be in contact with the palette.

Thereafter, when the drawing input is executed by the colored drawing unit, the color adjustment unit 1140 may color the drawing expression as if practically painted colors appear on a paper.

According to various embodiments, at least some of the devices (e.g., modules or functions thereof) or the method (e.g., operations) according to the present disclosure may be implemented by a command stored in a computer-readable storage medium in a programming module form. When the instruction is performed by at least one processor (e.g., the processor 120), the at least one processor may perform a function corresponding to the instruction. The computer-readable storage medium may be, for example, the memory 130. At least some of the programming modules may be implemented (e.g., executed) by, for example, the processor 120. At least some of the programming modules may include, for example, a module, a program, a routine, a set of instructions or a process for performing one or more functions.

The computer readable recording medium may include magnetic media such as a hard disc, a floppy disc, and a magnetic tape, optical media such as a compact disc read only memory (CD-ROM) and a DVD, magneto-optical media such as a floptical disk, and hardware devices specifically configured to store and execute program commands, such as a read only memory (ROM), a random access memory (RAM), and a flash memory. In addition, the program instructions may include high class language codes, which may be executed in a computer by using an interpreter, as well as machine codes made by a compiler. The aforementioned hardware device may be configured to operate as one or more software modules in order to perform the operation of the present disclosure, and vice versa.

A module or a programming module according to the present disclosure may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Further, some operations may be executed in a different order, some of the operations may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An input device for use with an electronic device, the input device comprising:
    an elongated body including, at an end thereof, an opening to a cavity within the elongated body;
    a drawing body including a cylindrical portion and an opening to a cavity within the drawing body at an end of the drawing body, the cylindrical portion being for insertion into the cavity within the elongated body through the opening included at the end of the elongated body; and
    a tip being inserted into the cavity within the drawing body,
    wherein, in a state in which the cylindrical portion is inserted into the cavity within the elongated body through the opening included at the end of the elongated body, the cylindrical portion is retained by the elongated body, wherein the tip includes a shoulder having a diameter larger than a diameter of the opening to the cavity within the drawing body, wherein the tip corresponds to an attribute determined by the electronic device, wherein the attribute is used by the electronic device to apply a drawing style associated with the attribute to an input by the input device to the electronic device, and wherein the tip is one of a plurality of tips each having a different attribute associated therewith.

2. The input device of claim 1, wherein the elongated body includes a circuit configured to detect attribute information of the tip associated with the attribute.

3. The input device of claim 2, wherein the circuit is further configured to communicate the detected attribute information to the electronic device.

4. The input device of claim 2, wherein the circuit is further configured to determine the attribute based on the detected attribute information.

5. The input device of claim 4, wherein the circuit is further configured to communicate the determined attribute to the electronic device.

6. The input device of claim 1, wherein the drawing body includes a circuit configured to communicate attribute information of the tip to the electronic device.

7. The input device of claim 1, wherein each of the plurality of tips has different attribute information associated therewith that is one of detectable by the elongated body or able to be communicated to the electronic device.

8. The input device of claim 1, wherein the elongated body is configured to only have one drawing body at a time inserted therein.

9. The input device of claim 1, wherein the input device provides input to the electronic device based on a user applied contact of the tip to a detection surface of a display of the electronic device.

10. The input device of claim 1, wherein the attribute is communicated from the input device to the electronic device upon the input device approaching the electronic device within a predetermined distance prior to the input device physically contacting the electronic device.

11. A method of using an input device with an electronic device, the input device comprising an elongated body including, at an end thereof, an opening to a cavity within the elongated body, a drawing body including a cylindrical portion, and a tip being inserted into a cavity within the drawing body, the method comprising:

receiving, by the elongated body, the cylindrical portion inserted into the cavity within the elongated body through the opening included at the end of the elongated body;

retaining, by the elongated body, the cylindrical portion inserted into the cavity within the elongated body through the opening included at the end of the elongated body; and providing, by the input device, an input to the electronic device, wherein the tip includes a shoulder having a diameter larger than a diameter of an opening to the cavity within the drawing body at an end of the drawing body, wherein the tip corresponds to an attribute determined by the electronic device, wherein the attribute is used by the electronic device to apply a drawing style associated with the attribute to the input by the input device to the electronic device, and wherein the tip is one of a plurality of tips each having a different attribute associated therewith.

12. The method of claim 11, further comprising:

detecting, by a circuit included in the elongated body, attribute information of the tip associated with the attribute.

13. The method of claim 12, further comprising:

communicating, by the circuit included in the elongated body, the detected attribute information to the electronic device.

14. The method of claim 12, further comprising:

determining, by the circuit included in the elongated body, the attribute based on the detected attribute information.

15. The method of claim 14, further comprising:

communicating, by the circuit included in the elongated body, the determined attribute to the electronic device.

16. The method of claim 11, further comprising:

communicating, by a circuit included in the drawing body, attribute information of the tip to the electronic device.

17. The method of claim 11, wherein each of the plurality of tips has different attribute information associated therewith that is one of detectable by the elongated body or able to be communicated to the electronic device.

18. The method of claim 11, wherein the elongated body is configured to only have one drawing body at a time inserted therein.

19. The method of claim 11, wherein the input to the electronic device is applied based on a user applied contact of the tip to a detection surface of a display of the electronic device.

20. The method of claim 11, wherein the attribute is communicated from the input device to the electronic device upon the input device approaching the electronic device within a predetermined distance prior to the input device physically contacting the electronic device.

* * * * *